US009065824B1

(12) United States Patent
Valdivia

(10) Patent No.: US 9,065,824 B1
(45) Date of Patent: Jun. 23, 2015

(54) REMOTE AUTHORIZATION OF ACCESS TO ACCOUNT DATA

(71) Applicant: Google Inc., Mountain View, CA (US)

(72) Inventor: Carlos Valdivia, Mountain View, CA (US)

(73) Assignee: Google Inc., Mountain View, CA (US)

( * ) Notice: Subject to any disclaimer, the term of this patent is extended or adjusted under 35 U.S.C. 154(b) by 28 days.

(21) Appl. No.: 14/216,066

(22) Filed: Mar. 17, 2014

(51) Int. Cl.
*H04L 29/06* (2006.01)

(52) U.S. Cl.
CPC ............ *H04L 63/0884* (2013.01); *H04L 63/08* (2013.01)

(58) Field of Classification Search
CPC .......................... H04L 63/08; H04L 63/0884
USPC .......................................................... 726/4
See application file for complete search history.

(56) References Cited

U.S. PATENT DOCUMENTS

| 6,757,719 | B1* | 6/2004 | Lightman et al. ............ 709/219 |
| 7,142,840 | B1* | 11/2006 | Geddes et al. ............... 455/411 |
| 7,487,537 | B2* | 2/2009 | Giles et al. ....................... 726/5 |
| 8,448,852 | B2* | 5/2013 | Dixon et al. .................. 235/380 |
| 8,566,915 | B2 | 10/2013 | Hsueh et al. |
| 8,627,438 | B1* | 1/2014 | Bhimanaik ...................... 726/9 |
| 8,712,631 | B2* | 4/2014 | Tietjen et al. ................ 701/31.5 |
| 8,746,556 | B2* | 6/2014 | Dixon et al. .................. 235/380 |
| 2006/0155653 | A1 | 7/2006 | Persokrud et al. |
| 2008/0179394 | A1* | 7/2008 | Dixon et al. .................. 235/380 |
| 2009/0119754 | A1* | 5/2009 | Schubert .......................... 726/4 |
| 2012/0054835 | A1* | 3/2012 | Oda et al. ........................ 726/4 |
| 2013/0090088 | A1 | 4/2013 | Chevsky et al. |
| 2013/0117457 | A1 | 5/2013 | Allen et al. |
| 2013/0167203 | A1* | 6/2013 | Etchegoyen ...................... 726/4 |
| 2013/0205330 | A1 | 8/2013 | Sinha et al. |
| 2013/0212637 | A1 | 8/2013 | Guccione et al. |
| 2013/0268766 | A1* | 10/2013 | Schrecker ...................... 713/185 |
| 2013/0290711 | A1* | 10/2013 | Rajkumar et al. ............ 713/168 |
| 2013/0339243 | A1* | 12/2013 | Dixon et al. .................... 705/44 |
| 2014/0007222 | A1* | 1/2014 | Qureshi et al. ................ 726/16 |

OTHER PUBLICATIONS

Bester et al.; GASS: a data movement and access service for wide area computing systems; Proceeding IOPADS '99 Proceedings of the sixth workshop on I/O in parallel and distributed systems; pp. 78-88; ACM New York, NY, USA 1999; ACM Digital Library.*
Kara et al.; Secure remote access from office to home; Published in: Communications Magazine, IEEE (vol. 39 , Issue: 10 ); pp. 68-72; Date of Publication : Oct 2001; Date of Current Version : Aug. 7, 2002; Issue Date: Oct 2001; IEEE Xplore.*
Devaul et al., U.S. Appl. No. 13/407,159, filed Feb. 28, 2012, 53 pages.
Valdivia, Carlos, U.S. Appl. No. 13/717,814, filed Dec. 18, 2012, 23 pages.

* cited by examiner

*Primary Examiner* — Bradley Holder
(74) *Attorney, Agent, or Firm* — McDonnell Boehnen Hulbert & Berghoff LLP

(57) ABSTRACT

An authentication request from a first client device may be received. The authentication request may identify an account. A second client device associated with the account may be determined. An authentication query may be transmitted to the second client device. An authentication response may be received from the second client device. The authentication response may authorize the first client device to access data associated with the account. At least some of the data associated with the account may be transmitted to the first client device.

16 Claims, 8 Drawing Sheets

REMOTE AUTHORIZATION OF ACCESS TO ACCOUNT DATA

BACKGROUND

An increasing number of client devices, including end-user devices as well as autonomous or semi-autonomous devices, support limited input and output modalities. For instance, they may lack a sufficient or convenient user interface for screen-based display of output or traditional data entry. However, these client devices may be able to access a network (e.g., the Internet), and therefore some applications executable on these devices may be configured with the credentials (e.g., a user name and password) of an online account. With access to such an account, the client device may apply preferences from the account, or otherwise customize or configure itself or its applications in accordance with data associated with the account.

The client device may also support various types of third-party applications that are not independently authorized to access the account. Thus, those applications may request access to the online account from the authorized applications and/or the client device itself. But, with the limited input and/or output modalities of the client device, it may be a challenge to display a consent screen and/or another mechanism through which consent can be granted or denied.

SUMMARY

An information rich consent screen may be difficult or impossible to properly represent on limited-modality client devices. However, many users who have online accounts typically access those accounts via other types of client devices, such as personal computers, tablets, and/or smartphones. The latter types of client devices may support a richer set of input and output modalities, through which a consent screen can be more easily displayed and navigated. Thus, for requests to access an account by applications executing on limited-modality devices, it may be beneficial to display a consent screen regarding this access on a personal computer, tablet, and/or smartphone that is associated with (e.g., logged in to) the account.

In a first example embodiment, an authentication request from a first client device may be received. The authentication request may identify an account. A second client device associated with the account may be determined. An authentication query may be transmitted to the second client device. An authentication response may be received via the second client device. The authentication response may authorize the first client device to access data associated with the account. At least some of the data associated with the account may be transmitted to the first client device.

In a second example embodiment, a first application that is associated with a user identifier may execute on a first client device. The first client device may obtain an authentication request from a second application executing on the first client device. The authentication request may seek to access data associated with the user identifier. The second application might not be authorized to access the data associated with the user identifier. The first client device may transmit the authentication request to a server device. From the server device, the first client device may receive an interstitial message indicating that authorization to access the data can be granted via a second client device. The first client device may display a representation of the interstitial message. The first client device may receive, from the server device, authorization for the second application to access the data associated with the user identifier.

In a third example embodiment, an article of manufacture may include a non-transitory computer-readable medium, having stored thereon program instructions that, upon execution by a computing device, cause the computing device to perform operations in accordance with the first and/or second example embodiments.

In a fourth example embodiment, a computing device may include at least one processor, data storage, and program instructions. The program instructions may be stored in the data storage, and upon execution by the at least one processor may cause the computing device to perform operations in accordance with the first and/or second example embodiments.

In a fifth example embodiment, a computing system may include data storage containing a mapping of user identifiers to device identifiers and data associated with at least some of the user identifiers, as well as an authentication component and a communication component. The communication component may be configured to provide, to the authentication component, an authentication request from a first client device. The authentication request may include a user identifier and seeks to access information associated the user identifier. The authentication component may be configured to determine, based on the mapping, a second client device associated with the user identifier. The communication component may be further configured to transmit, to the second client device, an authentication query, and receive, from the second client device, an authentication response. The authentication response may authorize the first client device to access the data associated with the user identifier. The communication component may be further configured to transmit, to the first client device, at least some data associated with the user identifier.

These as well as other embodiments, aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1A:
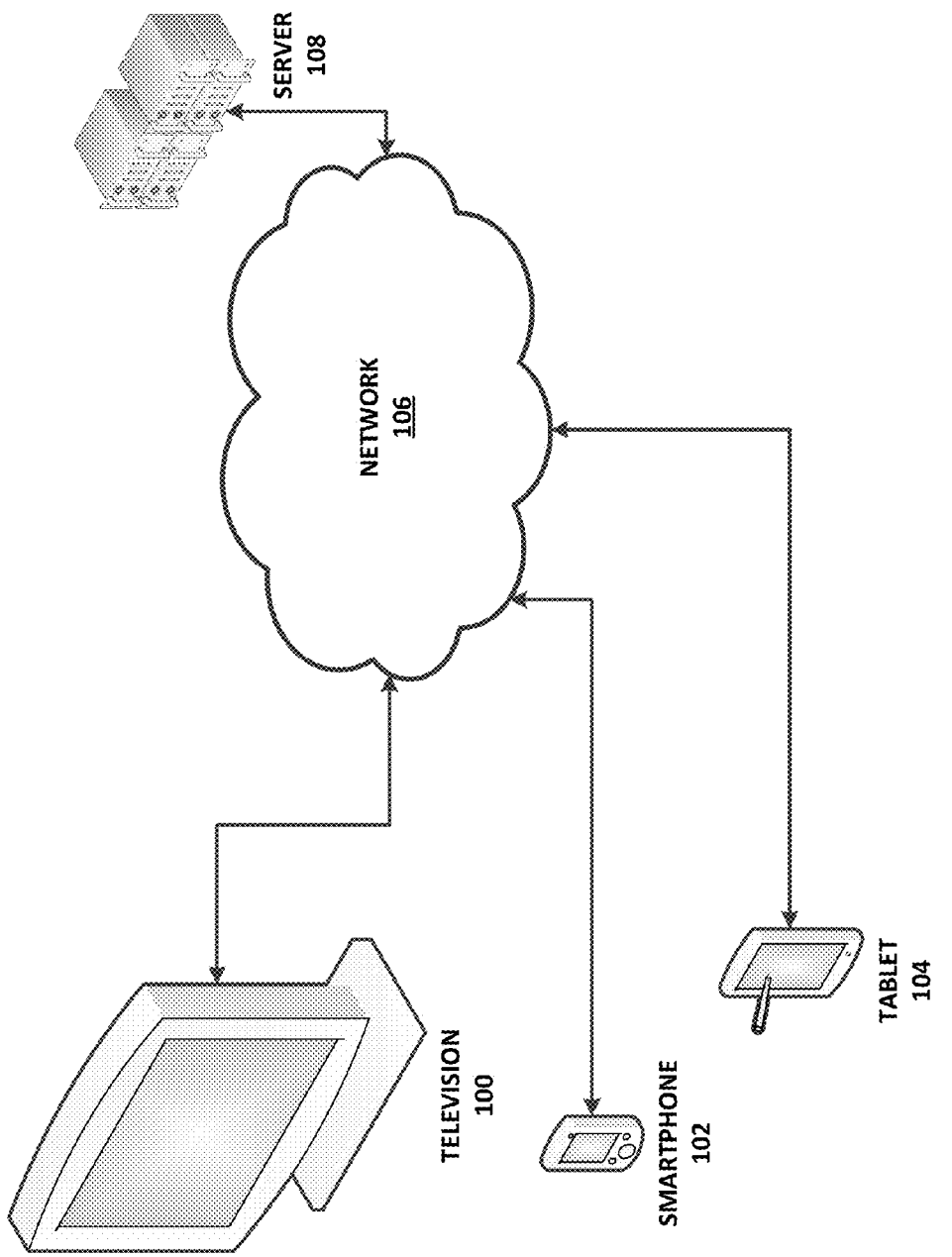
FIG. 1A depicts a networked environment, according to an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

1. Overview

Client devices with limited input and/or output modalities may include wearable computing devices, health monitoring devices, media devices, gaming devices, home automation devices, and other types of client devices. One possible reason for these limited modalities is design simplicity. For example, it may be desirable for a home automation device, such as a thermostat or an automated light switch, to support input via one or more simple buttons and output via a small screen or liquid crystal display (LCD). In another example, a network-enabled media player, such as a television, might be able to support more complex input and output modalities, but basic user interface navigation and text entry still might be difficult, error-prone, and/or time consuming, even with the assistance of a remote control.

In some cases, these limited-modality client devices may be configurable via a local area network (e.g., Ethernet or Wifi), point to point wireless network (e.g., BLUETOOTH), or an interface cable (e.g., a universal serial bus (USB) or high-definition multimedia interface (HDMI) cable). For instance, a media player might be initially plugged into an Ethernet local area network, discovered by an application operating on a personal computer, and configured via that application. In this way, the media player could be provisioned with various types of parameters, such as one or more passwords to local Wifi networks and/or credentials to online accounts. The media player may then be able to stream audio/visual content from the online account, such as music, movies, and so on, perhaps over the configured Wifi network(s). The media player might also be able to further customize its configuration based on data stored in or associated with the online account.

A difficulty emerges when a limited-modality client device supports third-party applications. In the context of this disclosure, a "third-party" application does not automatically have access to the online accounts configured on the client device. Instead the third-party application may request access to one or more of these accounts. Once such access is approved, the third-party application may be able to use some or all data associated with the account to configure its own behavior.

For security purposes, it is desirable to notify a user of the third-party application's request, and allow the user to either permit or deny access to the account. In some cases, this notification can take the form of a consent screen.

As noted previously, an information rich consent screen may be difficult or impossible to properly represent on limited-modality client devices. However, many users who have online accounts typically access those accounts via other types of client devices, such as personal computers, tablets, and/or smartphones. The latter types of client devices may support a richer set of input and output modalities, through which the consent screen can be more easily displayed or navigated. Thus, for requests to access an account by applications executing on limited-modality devices, it may be beneficial to display a consent screen regarding this access on a rich-modality device (e.g., a personal computer, tablet, and/or smartphone) that is associated with (e.g., logged in to) the account.

As an example, FIG. 1A depicts a networking environment including television 100, smartphone 102, and tablet 104, each communicatively coupled to server 108 via network 106. Television 100 may be a limited-modality device, in that it may be difficult to enter information into, or navigate a consent screen via television 100. As a result, when an application operating on television 100 seeks to access account data stored at server 108, server 108 may transmit the associated consent screen to smartphone 102 and/or tablet 104 instead of television 100.

Smartphone 102 and tablet 104 may be considered rich-modality devices, in that they exhibit input and/or output characteristics that are greater than those of television 100. For instance, smartphone 102 and/or tablet 104 may have similar display capabilities as television 100, but may support various models of input (e.g., keypad, keyboard, touchscreen, and/or voice control) that are not supported by television 100.

In response to receiving a representation of the consent screen, either or both of these devices may display the consent screen and facilitate the navigation thereof. Once the user provides consent for the application operating on television 100 to access the account data stored at server 108, server 108 may allow such access.

Figure 1B:
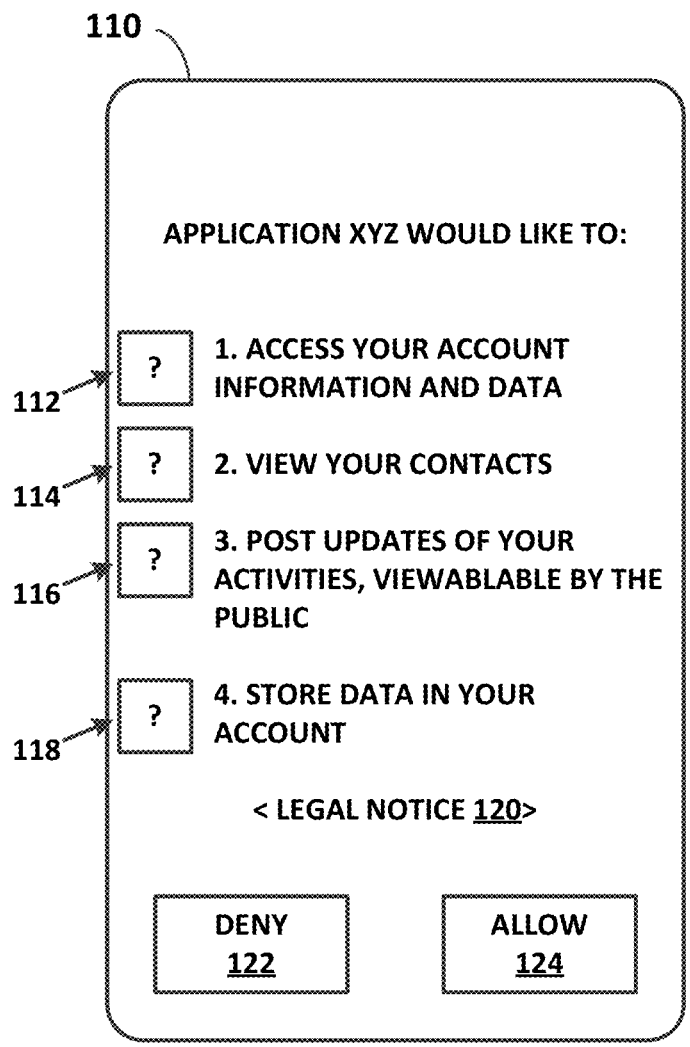
FIG. 1B is a depiction of a consent screen, according to an example embodiment.

FIG. 1B depicts an example consent screen 110, which in turn indicates that an application, Application XYZ, would like to access an online account. Consent screen 110 also indicates the nature of this access with the enumerated capabilities of what Application XYZ would be able to do if granted access. Each item in this list is associated with a nearby question box 112, 114, 116, and 118, respectively.

By selecting or otherwise triggering a particular question box, an explanation of the associated numbered item may be displayed, perhaps via other user interface screens, dialogs, or windows. Thus, if question box 112 is triggered, the consent screen might display ways in which online account information and data might be used, and/or the extent to which this information and data may be used. Similarly, if question box 114 is triggered, the consent screen might display ways in which contacts (e.g., contact information of friends, family members, acquaintances and business connections) associated with the account might be used, and/or the extent to which these contacts may be used. Comparable functionality may exist for question boxes 116 and 118.

Additionally, consent screen 110 may display legal notice 120. Legal notice 120 may include any number of screens, windows, pop-up dialogs, or other types of user interface widgets. Deny button 122 and allow button 124 may permit the user to deny or allow Application XYZ to perform the enumerated capabilities.

As an example, a social networking application operating on a client device may be authorized to access a social networking account on a remote social networking server. For instance, the social networking application might be provisioned with a user name and password associated with the social networking account. With these credentials, the social networking application can log into the account, post status updates to the account, and access the social networking account's list of social networking contacts.

After a gaming application is installed on the client device, the gaming application might detect the presence of the social networking application, and request access to the social networking account. In response, the client device may display a consent screen similar to consent screen 110. If the gaming application is allowed to access the social networking account, the gaming application may then post status updates to the social networking account related to the gaming application (e.g., high scores or challenges to other users). The gaming application might also read the social networking contacts and perhaps invite some of those contacts to install the gaming application on their client devices.

In order to further illustrate the hardware arrangements that might facilitate these features, the next section describes an example computing device (which may represent the structure of a limited-modality device and/or other types of client devices) and an example networked server cluster.

2. Example Computing Devices, Servers, and Systems

Figure 2:
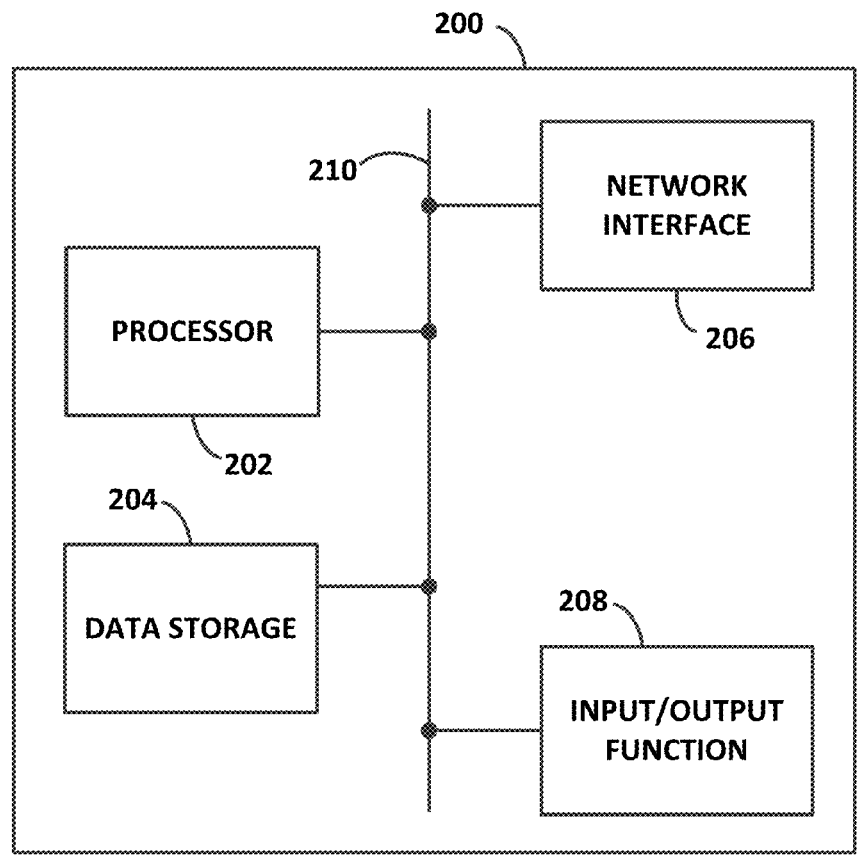
FIG. 2 illustrates a schematic drawing of a computing device, according to an example embodiment.

FIG. 2 is a simplified block diagram exemplifying a computing device 200, illustrating some of the functional components that could be included in a computing device arranged to operate in accordance with the embodiments herein. Example computing device 200 could be a personal computer (PC), laptop, server, or some other type of computational platform. For purposes of simplicity, this specification may equate computing device 200 to a server device or client device from time to time, and may also refer to some or all of the components of computing device 200 as a "processing unit." Nonetheless, it should be understood that the description of computing device 200 could apply to any component used for the purposes described herein.

In this example, computing device 200 includes a processor 202, a data storage 204, a network interface 206, and an input/output function 208, all of which may be coupled by a system bus 210 or a similar mechanism. Processor 202 can include one or more CPUs, such as one or more general purpose processors and/or one or more dedicated processors (e.g., application specific integrated circuits, digital signal processors, network processors, etc.).

Data storage 204, in turn, may comprise volatile and/or non-volatile data storage and can be integrated in whole or in part with processor 202. Data storage 204 can hold program instructions, executable by processor 202, and data that may be manipulated by these instructions to carry out the various methods, processes, or functions described herein. Alternatively, these methods, processes, or functions can be defined by hardware, firmware, and/or any combination of hardware, firmware and software. By way of example, the data in data storage 204 may contain program instructions, perhaps stored on a non-transitory, computer-readable medium, executable by processor 202 to carry out any of the methods, processes, or functions disclosed in this specification or the accompanying drawings.

Network interface 206 may take the form of a wireline connection, such as an Ethernet connection. Network interface 206 may also take the form of a wireless connection, such as IEEE 802.11 (Wifi), BLUETOOTH®, or a wide-area wireless connection. However, other forms of physical layer connections and other types of standard or proprietary communication protocols may be used over network interface 206. Furthermore, network interface 206 may comprise multiple physical interfaces.

Input/output function 208 may facilitate user interaction with example computing device 200. Input/output function 208 may comprise multiple types of input devices, such as a keyboard, a mouse, a touch screen, and so on. Similarly, input/output function 208 may comprise multiple types of output devices, such as a screen, monitor, printer, or one or more light emitting diodes (LEDs). Additionally or alternatively, example computing device 200 may support remote access from another device, via network interface 206 or via another interface (not shown), such as a universal serial bus (USB) or high-definition multimedia interface (HDMI) port.

In some embodiments, one or more computing devices may be deployed in a networked architecture. The exact physical location, connectivity, and configuration of the computing devices may be unknown and/or unimportant to client devices. Accordingly, the computing devices may be referred to as "cloud-based" devices that may be housed at various remote locations.

Figure 3:
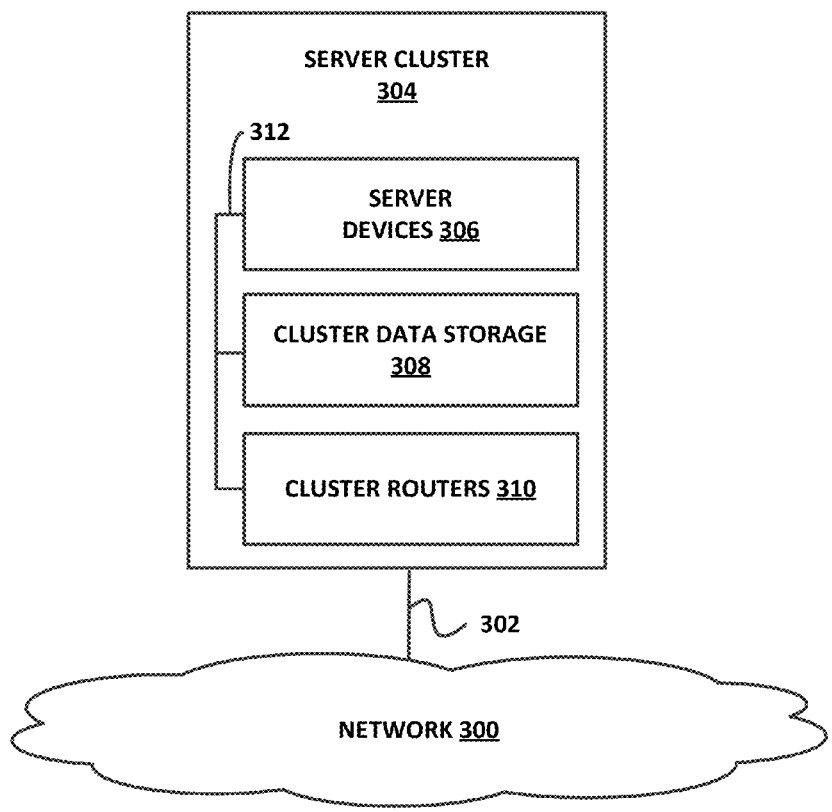
FIG. 3 illustrates a schematic drawing of a networked server cluster, according to an example embodiment.

FIG. 3 depicts a cloud-based server cluster 304 in accordance with an example embodiment. In FIG. 3, functions of computing device 200 may be distributed between server devices 306, cluster data storage 308, and cluster routers 310, all of which may be connected by local cluster network 312. The number of server devices, cluster data storages, and cluster routers in server cluster 304 may depend on the computing task(s) and/or applications assigned to server cluster 304.

For example, server devices 306 can be configured to perform various computing tasks of computing device 200. Thus, computing tasks can be distributed among one or more of server devices 306. To the extent that these computing tasks can be performed in parallel, such a distribution of tasks may reduce the total time to complete these tasks and return a result.

Cluster data storage 308 may be data storage arrays that include disk array controllers configured to manage read and write access to groups of hard disk drives. The disk array controllers, alone or in conjunction with server devices 306, may also be configured to manage backup or redundant copies of the data stored in cluster data storage 308 to protect against disk drive failures or other types of failures that prevent one or more of server devices 306 from accessing units of cluster data storage 308.

Cluster routers 310 may include networking equipment configured to provide internal and external communications for the server clusters. For example, cluster routers 310 may include one or more packet-switching and/or routing devices configured to provide (i) network communications between server devices 306 and cluster data storage 308 via cluster network 312, and/or (ii) network communications between the server cluster 304 and other devices via communication link 302 to network 300.

Additionally, the configuration of cluster routers 310 can be based at least in part on the data communication requirements of server devices 306 and cluster data storage 308, the latency and throughput of the local cluster networks 312, the latency, throughput, and cost of communication link 302, and/or other factors that may contribute to the cost, speed, fault-tolerance, resiliency, efficiency and/or other design goals of the system architecture.

3. Example Operations

Figure 4:
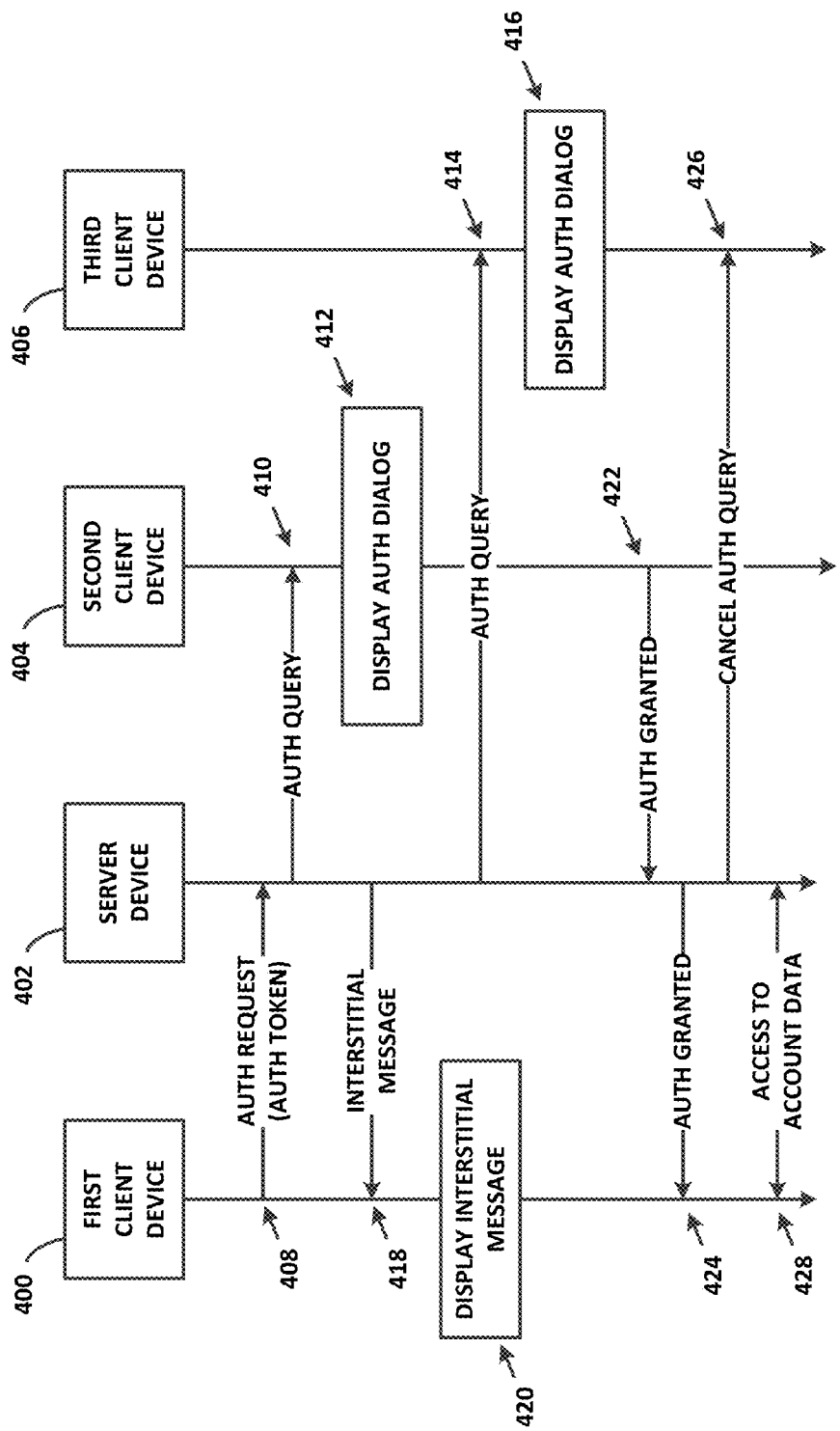
FIG. 4 is a message flow diagram, according to an example embodiment.

FIG. 4 is message flow diagram that illustrates an example embodiment. In FIG. 4, first client device 400 may be a limited-modality device, while second client device 404 and third client device 406 might not be limited-modality devices. For example, first client device 400 might be a media player or a home automation device, while second client device 404 might be a smartphone and third client device 406 might be a tablet computer. Thus, first client device 400, second client device 404, and/or third client device 406 may be configured as or similarly to computing device 200.

Server device 402 may be a local or remote networked server or server cluster. Server device 402 may be configured as or similarly to computing device 200 and/or server cluster 304. Further, server device 402 may contain or have access to one or more accounts that are each associated with account credentials, such as a user name and a password, as well as device identifiers of one or more client devices associated with the account, and possibly other data as well.

First client device 400, second client device 404, and third client device 406 may be configured with credentials of an account accessible via server device 402, and/or may be authorized to access this account and its associated data. However, an application executing on first client device 400 might not be authorized to access this account. For instance, the application might not be currently authorized to access the account, but may be capable of obtaining such authorization. Thus, the application may request access to this account via first client device 400.

Possibly in response to the application requesting access to the account, as well as first client device 400 being a limited-modality device, at step 408 first client device 400 may transmit an authentication request to server device 402. The authentication request may include an authentication token or other information that, in some fashion, identifies the account (e.g., a user name or some other type of user identifier).

After receiving the authentication request, server device 402 may use the authentication token or other information to identify the account. This may involve server device 402 using the authentication token or other information to perform a lookup in an account database. Associated with the account may be device identifiers (e.g., serial numbers, Internet Protocol (IP) addresses, or some other form of identification) for second client device 404 and third client device 406. Some extent of data may also be associated with the account. Indications that second client device 404 and third client device 406 are not limited-modality devices (and therefore more amendable to displaying a consent screen) may also be included in the account.

Once the account is identified, server device 402 may determine that second client device 404 and third client device 406 are both logged into the account. Therefore, it may be more convenient to display the consent screen for the application's access to the account on second client device 404 and/or third client device 406 instead of first client device 400.

Accordingly, at steps 410 and 414, server device 402 may transmit authentication queries to both second client device 404 and third client device 406. At steps 412 and 416, these devices may respectively display authentication dialogs. The authentication dialogs may include representations of a consent screen.

Before, after, or in parallel to any of steps 410, 412, 414, and 416, server device 402 may also transmit an interstitial message to first client device 400, and first client device 400 may display this interstitial message in whatever way is appropriate given its limited output modality. The interstitial message might be some form of indication that the user should use the second or third client device to review a consent screen. For example, if first client device 400 is a television, the interstitial message might be "Please look at your smartphone or your tablet for a consent screen regarding this application's access to your account." However, for devices with more restricted output interfaces, the interstitial message might be as simple as "Check phone" or a numeric code. Nonetheless, in place of an interstitial message, any other type of message may be used, and the embodiments herein are not limited to use of interstitial messages.

In any case, at step 422, second client device 404 transmits an authentication granted message to server device 402. This indicates that the user, via second client device 404, has allowed the application to access the account. At step 424, server device 402 may also transmit an authentication granted message to first client device 400, indicating the same. At step 428, first client device 400 may then allow the application to access account data stored on or associated with server device 402, as well as perform other operations related to the account. For instance, server device 402 may transmit at least some of the account data to first client device 400.

Optionally, at step 426 server device 402 may transmit a cancel authentication query message to third client device 406, so that the user is not confused by seeing the consent screen on that device as well.

Figure 5:
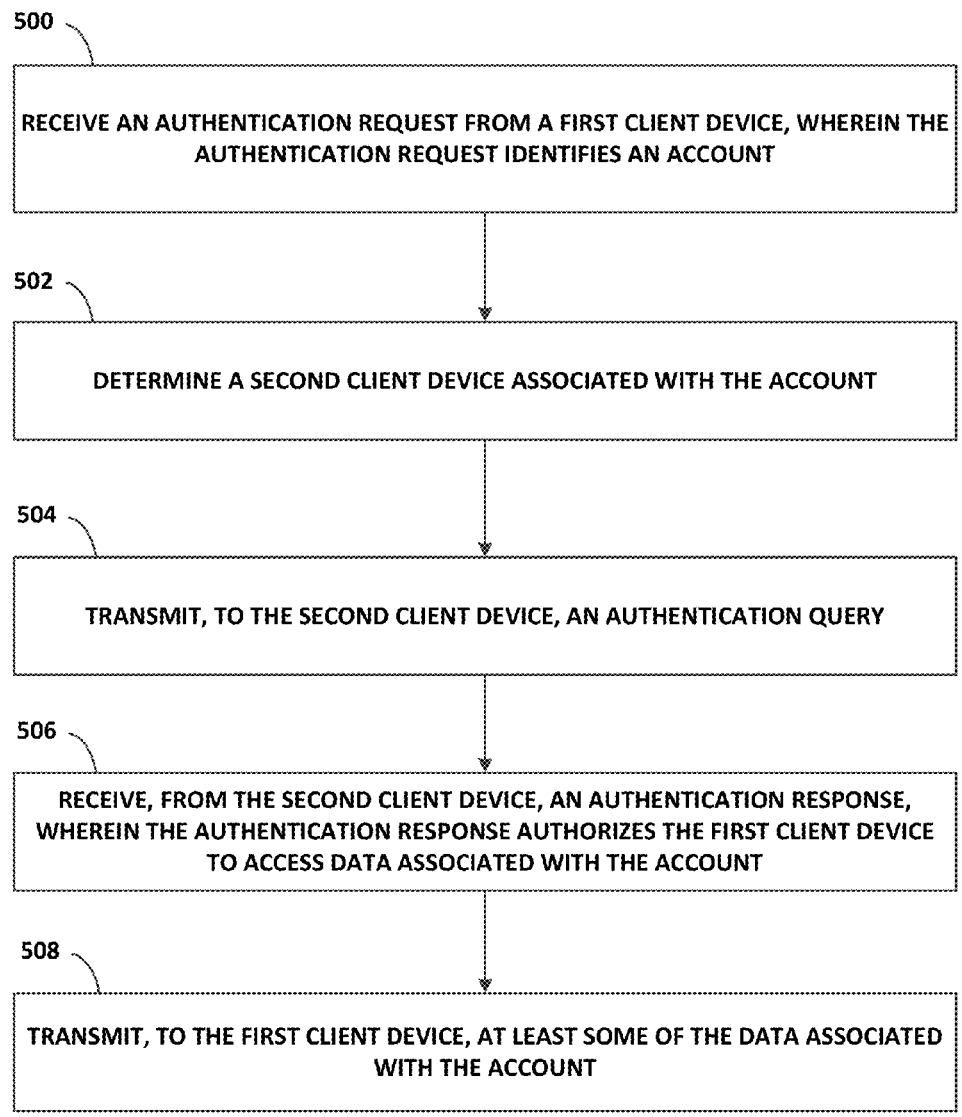
FIG. 5 is a flow chart, according to an example embodiment.
Figure 6:
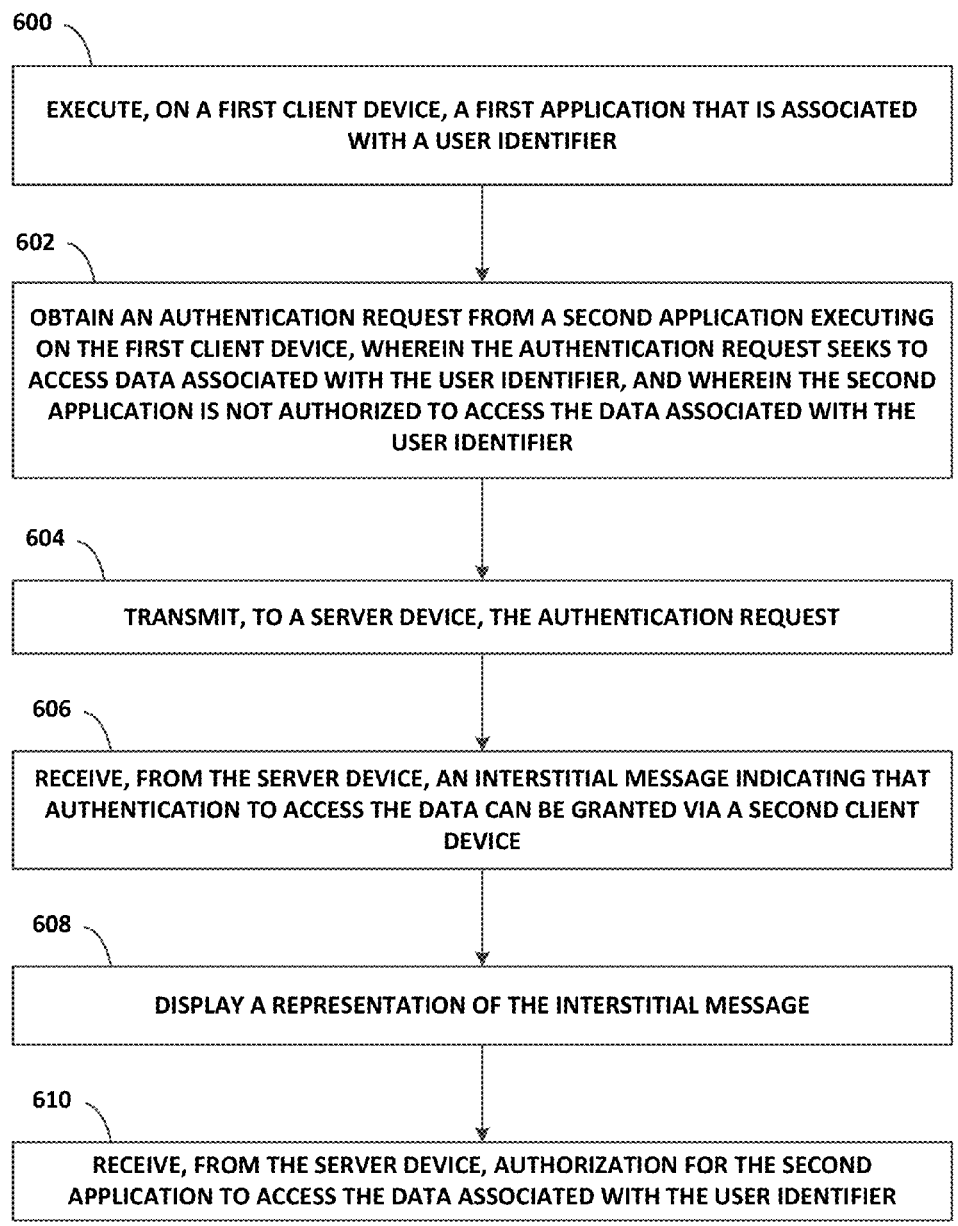
FIG. 6 is a flow chart, according to an example embodiment.

It should be understood that the procedures described herein may be used for remote authorization of client devices that are not limited-modality devices, and/or applications operating on client devices that are not limited-modality devices. Thus, the mechanisms described herein may include general procedures for remotely authenticating functions of any type of device or application FIGS. 5 and 6 are flow charts illustrating respective methods according to example embodiments. The processes illustrated by FIGS. 5 and 6 may be carried out by a computing device, such as computing device 200, and/or a cluster of computing devices, such as server cluster 304. However, either process can be carried out by other types of devices or device subsystems.

At block 500, an authentication request may be received from a first client device. The authentication request may identify an account. For instance, the authentication request may include a user identifier.

In some embodiments, the first client device may be a media device, a home-automation device, or a health-monitoring device. In other embodiments the first client device may be a wireless communication device or a wearable computing device. Other types of client devices may be supported.

At block 502, a second client device associated with the account may be determined. Determining the second client device associated with the account may involve looking up the user identifier in a database to determine a device identifier of the second client device.

At block 504, an authentication query may be transmitted to the second client device. The authentication query may trigger the second client device to display, on behalf of the first client device, a dialog requesting access to the data associated with the account. Based on the account, an interstitial message may also be transmitted to the first client device. The interstitial message may indicate that the authentication to the account can be granted from the second client device.

At block 506, an authentication response may be received from the second client device. The authentication response may authorize the first client device to access data associated with the account. At block 508, at least some of the data associated with the account may be transmitted to the first client device.

In some embodiments, the user identifier may be associated with a first application executing on the first client device, and authentication request may be originated from a second application executing on the first client device. The second application might not be authorized to access the data associated with the authentication token. After obtaining such authorization, at least some of the data associated with the account may be transmitted to the second application.

In addition, a third client device associated with the account may also be determined. A second authentication query may be transmitted to the third client device. Possibly after receiving the authentication response, a cancellation of the second authentication query may be transmitted to the third client device.

Turning to FIG. 6, at block 600, a first client device may execute a first application that is associated with a user identifier. At block 602, an authentication request may be obtained from a second application executing on the first client device. The authentication request may seek to access data associated with the user identifier. The second application might not be authorized to access the data associated with the user identifier. At block 604, the authentication request may be transmitted to a server device.

At block 606, an interstitial message may be received from the server device. The interstitial message may indicate that authorization to access the data can be granted from a second client device. At block 608, the first client device may display a representation of the interstitial message.

At block 610, authorization for the second application to access the data associated with the user identifier may be received from the server device. Additionally, the data associated with the user identifier may be received from the server device. The first client device may provide the data associated with the user identifier to the second application.

It should be understood that FIGS. 4, 5, and 6 depict non-limiting embodiments. Thus, more or fewer steps than shown in FIGS. 4, 5, and 6 may be used without departing from the scope of the embodiments herein. Additionally, some of these steps may be repeated one or more times, or may be omitted altogether. Further, the message flows and flow charts of the figures may be combined with one another and/or with other aspects described this specification and its accompanying drawings, in whole or in part, also without departing from the scope of the embodiments herein. For instance, any of the features discussed in the context of FIGS. 4 and/or 5 may also be applied to methods illustrated by the flow chart of FIG. 6.

4. Example Computing System

Figure 7:
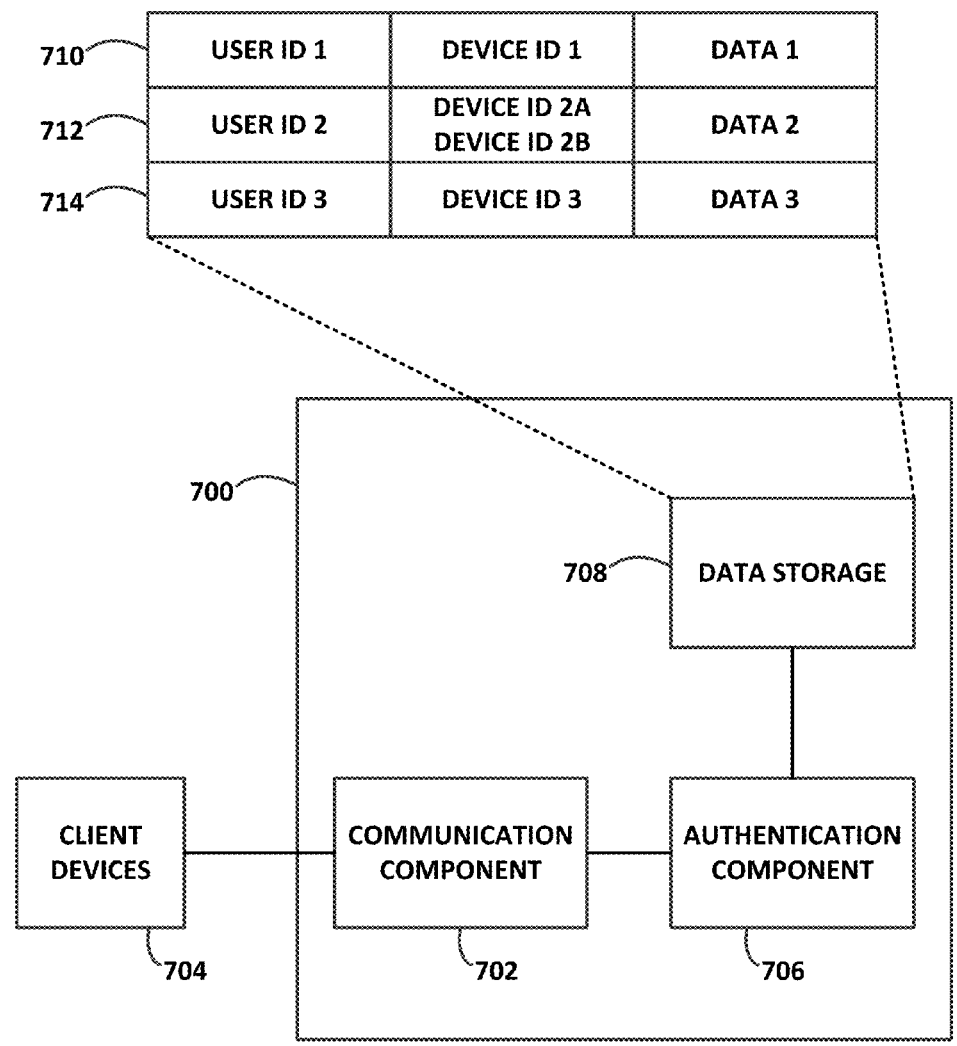
FIG. 7 is a computing system, according to an example embodiment.

As a further illustration of possible embodiments, FIG. 7 includes example computing system 700. Computing system 700 may include communication component 702, authentication component 706, and data storage 708. Computing system 700 may involve one or more individual computing devices, such as example computing device 200. Thus, each of communication component 702, authentication component 706, and data storage 708 may be physically distinct computing devices, or one or more may be combined into a single physically distinct computing device.

Regardless, communication component 702 may be communicatively coupled to authentication component 706, and authentication component 706 may be communicatively coupled to data storage 708. However, more communicative couplings may exist. For instance, communication component 702 may be communicatively coupled to one or more client devices 704.

Data storage 708 may contain one or more database entries. Each database entry may include a user identifier (e.g., a user name), one or more device identifiers of client devices associated with the user identifier, and data. Therefore, entry 710 contains user identifier 1, device identifier 1, and data 1. Entry 712 contains user identifier 2, device identifier 2a, device identifier 2b, and data 2. In this way, entry 712 represents a situation where more than one client device is associated with the user identifier. Entry 714 contains user identifier 3, device identifier 3, and data 3. Each entry may represent part or all of an account.

Computing system 700 may be configured to carry out one or more of the steps of FIGS. 4, 5, and/or 6. Thus, for example, communication component 702 may be configured to provide, to authentication component 706, an authentication request from a first client device of client devices 704. The authentication request may include a user identifier and may seek to access data associated with the user identifier. The user identifier may serve to specify an account. Authentication component 706 may be configured to receive the authentication request and look up the user identifier in data storage 708.

Authentication component 706 may also be configured to determine, possibly based on a mapping between user identifiers, device identifiers and data in data storage 708, one or more device identifiers associated with the user identifier. The device identifiers may identify, for example, a second client device and/or a third client device. Thus, a device identifier may take the form of an address, serial number, reference number, or some other type of token associated with a device.

Authentication component 706 may provide, to communication component 702, the one or more device identifiers associated with the user identifier. Communication component 702 may be further configured to transmit authentication queries to devices associated with the device identifiers. Thus, for instance, if the one or more device identifiers include a device identifier of a second client device, communication component 702 may transmit an authentication query to the second client device. The authentication query may trigger the second client device to display, on behalf of the first client device, a dialog requesting access to the data associated with the user identifier. Communication component 702 may also be configured to transmit, to the first client device, an interstitial message indicating that authentication can be granted from the second client device.

Communication component 702 may also be configured to receive, from the second client device, an authentication response. The authentication response may authorize the first client device to access the data associated with the user identifier. Communication component 702 may also be configured to transmit, to the first client device, at least some data associated with the user identifier.

In some embodiments, the one or more device identifiers may include a device identifier of a third client device. In this case, any interstitial message transmitted to the first client device may also indicate that authentication can be granted from the third client device. Communication component 702 may be further configured to transmit, to the third client device, a second authentication query. After receiving the authentication response, communication component 702 may transmit, to the third client device, a cancellation of the second authentication query.

The user identifier may be associated with a first application executing on the first client device, and the authentication request may be originated from a second application executing on the first client device. Therefore, transmitting at least some of the data associated with the authentication token may involve transmitting, to the second application, at least some of the data associated with the authentication token.

5. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages can be executed out of order from that shown or discussed, including substantially concurrent or in reverse order, depending on the functionality involved. Further, more or fewer blocks and/or functions can be used with any of the ladder diagrams, scenarios, and flow charts discussed herein, and these ladder diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
   receiving, at a computing system, an authentication request from a limited modality client device, where the limited modality client device exhibits limited input or output capabilities, where the authentication request identifies an account accessible to the computing system and is transmitted in response to the limited modality client device attempting to access data associated with the account, where the authentication request includes a user identifier associated with the account, and where the user identifier is associated with a first application executing on the limited modality client device, where the authentication request is originated from a second application executing on the limited modality client device, and where the second application is not authorized to access the data associated with the account;
   based on the limited modality client device exhibiting limited input or output capabilities, identifying, by the computing system, a rich-modality client device associated with the account, where the rich-modality client device exhibits input or output capabilities that are greater than those of the limited modality client device, and where the rich-modality client device is authorized to access the data associated with the account;
   transmitting, by the computing system, an authentication query to the rich modality client device, where the authentication query requests authorization for the limited modality client device to access the data associated with the account;
   receiving, by the computing system, an authentication response from the rich modality client device, where the authentication response authorizes the limited modality client device to access the data associated with the account; and
   based on the authentication response from the rich modality client device, transmitting, by the computing system, at least some of the data associated with the account to the limited modality client device.

2. The method of claim 1, further comprising:
   determining a second rich modality client device associated with the account;
   transmitting, to the second rich modality client device, a second authentication query; and
   after receiving the authentication response, transmitting, to the second rich modality client device, a cancellation of the second authentication query.

3. The method of claim 1, wherein the authentication query triggers the rich-modality client device to display, on behalf of the limited modality client device, a dialog requesting access to the data associated with the account.

4. The method of claim 1, further comprising:
transmitting, to the limited modality client device, an interstitial message indicating that authentication can be granted via the rich-modality client device.

5. The method of claim 1, wherein identifying the rich-modality client device associated with the account comprises looking up the user identifier in a database to determine a device identifier of the rich-modality client device.

6. The method of claim 1, wherein transmitting at least some of the data associated with the account comprises transmitting, to the second application, at least some of the data associated with the account.

7. The method of claim 1, wherein the limited modality client device is a media device, a home-automation device, or a health-monitoring device.

8. The method of claim 1, wherein the limited modality client device is a wireless communication device or a wearable computing device.

9. A computing device comprising:
at least one hardware processor;
a memory; and
program instructions, stored in the memory, that upon execution by the at least one processor are configured to cause the computing device to:
receive an authentication request from a limited modality client device, where the limited modality client device exhibits limited input or output capabilities, and where the authentication request identifies an account accessible to the computing device and is transmitted in response to the limited modality client device attempting to access data associated with the account, where the authentication request includes a user identifier associated with the account, and where the user identifier is associated with a first application executing on the limited modality client device, where the authentication request is originated from a second application executing on the limited modality client device, and where the second application is not authorized to access the data associated with the account;
based on the limited modality client device exhibiting limited input or output capabilities, identify a rich modality client device associated with the account, where the rich modality client device exhibits input or output capabilities that are greater than those of the limited modality client device, and where the rich modality client device is authorized to access the data associated with the account;
transmit an authentication query to the rich modality client device, where the authentication query requests authorization for the limited modality client device to access the data associated with the account;
receive an authentication response from the rich modality client device, where the authentication response authorizes the limited modality client device to access the data associated with the account; and
based on the authentication response from the rich modality client device, transmit, at least some of the data associated with the account to the limited modality client device.

10. The computing device of claim 9, wherein the program instructions are further configured to cause the computing device to:
determine a second rich modality client device associated with the account;
transmit, to the second rich modality client device, a second authentication query; and
after receiving the authentication response, transmit, to the second rich modality client device, a cancellation of the second authentication query.

11. The computing device of claim 9, wherein the authentication query triggers the rich modality client device to display, on behalf of the limited modality client device, a dialog requesting access to the data associated with the account.

12. The computing device of claim 9, wherein the program instructions are further configured to cause the computing device to:
transmit, to the limited modality client device, an interstitial message indicating that authentication can be granted via the rich modality client device.

13. The computing device of claim 9, wherein identifying the rich modality client device associated with the account comprises looking up the user identifier in a database to determine a device identifier of the rich modality client device.

14. The computing device of claim 9, wherein transmitting at least some of the data associated with the account comprises transmitting, to the second application, at least some of the data associated with the account.

15. The computing device of claim 9, wherein the limited modality client device is a media device, a home-automation device, or a health-monitoring device.

16. An article of manufacture including a non-transitory computer-readable medium, having stored thereon program instructions that, upon execution by a computing device, cause the computing device to perform operations comprising:
receiving an authentication request from a limited modality client device, where the limited modality client device exhibits limited input or output capabilities, and where the authentication request identifies an account accessible to the computing device and is transmitted in response to the limited modality client device attempting to access data associated with the account, where the authentication request includes a user identifier associated with the account, and where the user identifier is associated with a first application executing on the limited modality client device, where the authentication request is originated from a second application executing on the limited modality client device, and where the second application is not authorized to access the data associated with the account;
based on the limited modality client device exhibiting limited input or output capabilities, identifying a rich modality client device associated with the account, where the rich modality client device exhibits input or output capabilities that are greater than those of the limited modality client device, and where the rich modality client device is authorized to access the data associated with the account;
transmitting an authentication query to the rich modality client device, where the authentication query requests authorization for the limited modality client device to access the data associated with the account;
receiving an authentication response from the rich modality client device, where the authentication response authorizes the limited modality client device to access the data associated with the account; and based on the authentication response from the rich modality client device, transmitting, at least some of the data associated with the account to the limited modality client device.

* * * * *